United States Patent Office 3,103,484
Patented Sept. 10, 1963

3,103,484
ANODES FOR ELECTROLYTIC CHLORINE EVOLUTION
Georg Messner, Milan, Italy, assignor to Oronzio de Nora Impianti Elettrochimici, Milan, Italy, a corporation of Italy
No Drawing. Filed Oct. 4, 1960, Ser. No. 60,307
3 Claims. (Cl. 204—290)

This invention relates to novel anodes comprised of platinum or titanium-platinum coated with a layer of magnetite which has an empirical formula of $Fe_3O_4$.

The production of chlorine has become very important in the chemical field and the trend in chlorine manufacture in the United States and Europe is more and more to the use of the mercury cell. In a typical horizontal mercury cell there is a bed of slowly flowing mercury and disposed thereover are anodes approximately 2 mm. away from the mercury to form an amalgam and is later decomposed brine is run into the cell on top of the mercury. When an electric current is passed throught the cell, chlorine is liberated at the anode and the sodium is absorbed in the mercury to form an amalgam and is later decomposed in the presence of water to form sodium hydroxide.

The anodes are usually made of graphite. However, the graphite is rather rapidly consumed and frequent, cumbersome and time-consuming readjustment of the electrodes is necessary in order to maintain the proper electrode distance. Also, carbon dioxide formed from the decomposed graphite is evolved with the chlorine and has to be separated from the chlorine. Therefore, graphite anodes are not too desirable.

Anodes of platinum metals such as platinum, iridium and rhodium, or alloys of these metals, have also been used. These anodes are better than the graphite anodes as no carbon dioxide is formed to interfere with the chlorine gas. Also, the platinum type anodes are not consumed as rapidly as graphite and therefore do not have to be readjusted frequently.

The platinum-type anodes have disadvantages, however. After only a short period of anode operation, the potential of the platinum-type anodes is increased and there is an increased energy consumption in the electrolytic process. Furthermore, while the platinum-type anodes are not consumed as rapidly as graphite, there is depletion of the anode on the order of 1 to 3 grams of metal per ton of chlorine produced. Due to the high cost of the platinum-type metals, this adds a substantial expense to the operation of the mercury cell.

Anodes composed of iron or steel as a base and coated with magnetite as a protection against erosion are known. However, the coefficient of expansion of magnetite relative to the iron or steel base is so different that the adhesive bond between the magnetite and the base metal is broken and the magnetite layer flakes off from the base metal which is then depleted. The exposure of the base metal may lead to serious consequences in the cell operation.

It is an object of the present invention to obtain a platinum type anode which is not consumed in the production of chlorine in a mercury cell.

It is another object of the invention to obtain a mercury cell anode which has a low single potential.

It is another object of the invention to obtain a titanium-platinum-magnetite anode which results in a reduction in the amount of platinum needed for the anode.

It is a further object of the invention to produce a novel platinum type anode by coating a platinum-type metal with a layer of magnetite which has the empirical formula of $Fe_3O_4$.

These and other objects and advantages will become more obvious from the following detailed description.

The anodes of the present invention consist of platinum-type metals covered by a layer of magnetite. The anode base need not consist entirely of the platinum-type metal. A base metal such as titanium or tantalum coated with a thin layer of a platinum-type metal may also be used so that there is a reduction in the amount of platinum needed for the anode. Due to the expense of tantalum, titanium coated with a platinum-type metal is preferred.

Titanium or tantalum covered with magnetite cannot be satisfactorily used as an anode although they are effective conductors of electricity. When the iron on titanium or tantalum is oxidized to form the magnetite covering, the oxidation is either incomplete or carried out too far. If incomplete, not all the iron will be oxidized to magnetite and the unoxidized iron will dissolve in the mercury cell and the magnetite coating will chip off. If the oxidation is carried too far, the titanium or tantalum will be oxidized to titanium dioxide or tantalum dioxide, respectively, which are non-conductors of electricity. This problem does not occur in the platinum-type metal-magnetite, tantalum-platinum-type metal-magnetite or titanium-platinum-type metal-magnetite anodes as the platinum-type metals are not affected by the oxidation.

The anodes of the present invention overcome the disadvantages of the previous electrodes. No carbon dioxide is formed which would complicate the recovery of chlorine gas. The magnetite coating prevents depletion of the anode, and the use of platinum-type metals, tantalum-platinum-type metals or titanium-platinum-type metals as the core of the anode produces an anode with a low single potential. By the use of titanium or tantalum coated with a thin layer of platinum as the base metal, a substantial reduction in the amount of platinum needed for the anode is obtained.

One way of applying the magnetite coating to the platinum anode is to form a thin layer of iron or an iron alloy on the platinum-type metal and then oxidize the iron. The layer of iron may be formed electrolytically, with a metal spray gun, by dusting, or any other manner. The iron layer is oxidized by heating the anode in an atmosphere of a mixture of an inert gas such as argon or helium and carbon dioxide, air, water, or diluted oxygen at a temperature between 600° and 900° C. to produce a magnetite layer which adheres firmly to the platinum-type metal. Instead of diluting the oxidizing atmosphere with an inert gas, reduced pressures, preferably 200 to 600 mm. Hg, may be used.

The magnetite layer may also be applied by depositing iron compounds, such as the hydroxide of bi- or tri-valent iron, iron carbonate, iron oxalate, or any other iron compound which decomposes upon being heated to temperatures of 600° to 900° C. and which may be transformed into a compound corresponding approximately to $Fe_3O_4$ by the presence of an oxidizing atmosphere such as that described above. The iron compounds may be deposited on the platinum-type metal by chemical or electrophoretic precipitation or by mechanical spraying, rolling or painting on the platinum-type metal.

Particularly well adhering magnetite coatings are those which are obtained by at least slightly diffusing the iron layer in the platinum-type metal layer prior to oxidation, for example, by a heat treatment in an inert atmosphere at a temperature between 700° and 900° C., preferably 800° C. In those cases where iron compounds are applied to the platinum-type metal, the layer is treated under reducing conditions prior to the heat treatment for the purpose of diffusion, for example, by passing a dry stream of hydrogen over the iron compound layer at elevated temperatures. After transformation of the iron compound into the magnetite, the magnetite layer can be made still more resistant against wear by a subsequent heat treatment.

In the following examples there are described several preferred embodiments to illustrate the invention. However, it should be understood that the invention is not intended to be limited to the specific embodiments. While the specific examples use only platinum or titanium-platinum as the base metal, any one of the platinum metals or alloys or mixtures thereof may be used with equal success. The platinum metals include osmium, rhodium, iridium, rhenium, ruthenium, palladium and masurium as well as platinum.

Example 1

A metal sheet made of platinum which has the final shape of an anode and is provided with perforations or slits is electrolytically coated in an iron sulfate bath with a layer of 0.020 mm. of iron. After washing and drying, the coated sheet is heated in an atmosphere consisting of about 50% $CO_2$ and 50% argon for one hour at 800° C. and is then allowed to cool in an atmosphere of argon.

A dark violet oxide layer is formed which, in the role of an anode, evolves chlorine in a NaCl solution having a sodium chloride content of 300 grams per liter with no attack of the platinum taking place. The single potential of the anode during continuous electrolysis in sodium chloride solution and a current density of 30 amperes per $dm.^2$ is 0.4 volt lower than the single potential of a platinum sheet under an identical load. The wear of the active magnetite layer is so low that the anode remains operative over about one year. At the end of a year's operation, the platinum base may be cleaned and recoated as described above.

Example 2

A piece of metal mesh made of titanium sheet 2 mm. thick is coated with a platinum layer of about 0.005 mm. thickness. An iron layer of 0.02 mm. thickness is applied to this platinum layer in a vacuum by means of a cathode spray. Thereafter, the coating is heated in an inert atmosphere of argon for one-half hour at 800° C. and is then treated in a gas atmosphere consisting of approximately 10% $H_2O$, 30% $CO_2$ and 60% argon for one hour at 700° C. The metal mesh is allowed to cool in a dry argon atmosphere. The magnetite layer thus produced protects the platinum from depletion during anodic chlorine production and exhibits a lower anodic single potential than platinum metal. It is advantageous to apply a heat treatment at 900° C. in an inert atmosphere, either in a vacuum or in a noble gas atmosphere, subsequent to the oxidation at 700° C.

Example 3

An iron layer of about 0.1 mm. thickness is sprayed with the aid of a spray gun upon a perforated platinized titanium sheet 2 mm. thick, and the resulting sheet is heated for two hours in a pure, dry atmosphere of argon at 900° C. and is then oxidized for two hours at 650° C. in a dry mixture consisting of about 50% $CO_2$ and 50% pure argon. The treated sheet is allowed to cool in a dry atmosphere of argon. The operation may be repeated if a thicker magnetite layer is desired.

Example 4

A perforated sheet of platinum 2 mm. thick is provided with an iron layer of about 0.025 mm. thickness by electroplating means, heated in vacuo for 30 minutes at 750° C., then oxidized in an atmosphere of 50% argon and 50% $CO_2$ for one hour at 650° C., again provided with a layer of iron 0.025 mm. thick by electroplating means, and again oxidized in the same manner.

The treated sheet is allowed to cool in a vacuum. Depending upon the desired life of the anode, this process may be repeated in order to obtain a correspondingly thick layer of magnetite.

Example 5

A layer of iron 0.025 mm. thick is dusted in a vacuum on a perforated sheet made of platinum, $CO_2$ gas corresponding to about 300 mm. Hg is then introduced for about one hour during which the sheet is heated to about 650° C. Thereafter, the dusting of iron in a vacuum is repeated until an additional 0.025 mm. of iron have been deposited, which is then again oxidized into magnetite as already described. This cycle is repeated until the desired thickness of the magnetite layer is reached. Thereafter, the coated platinum sheet is allowed to cool in argon. The anode produced in this manner has an increased life as a chlorine-evolving anode in aqueous solutions of chloride.

Example 6

A layer of iron about 0.02 mm. thick is applied by electroplating means to a sheet made of platinum provided with slit-like apertures and the iron coated sheet is oxidized at 650° C. in an atmosphere composed of $CO_2$ and argon. A layer of iron approximately 0.1 mm. thick is then applied to the magnetite layer by means of a metal spray gun, and this iron layer is oxidized in a $CO_2$-argon atmosphere at 650° C. for two hours. The treatment can be repeated until the desired thickness of the magnetite layer is reached.

Various modifications of the products and the process of the present invention may be made without departing from the spirit of this invention or the scope thereof, and it is to be understood that the invention is limited only as defined in the appended claims.

I claim:

1. An electrolytic anode consisting of a base metal selected from the group consisting of titanium and tantalum, a thin adherent coating of a platinum metal on said base metal, and an exterior thin adherent coating of magnetite over said platinum metal coating.

2. The electrolytic anode of claim 1 in which the coating of platinum and the coating of magnetite is on an anodically active surface only of said base metal.

3. An electrolytic anode consisting of a base metal selected from the group consisting of titanium and tantalum, a thin adherent porous coating of a platinum metal on said base metal, and an exterior thin adherent porous coating of magnetite over said platinum metal coating.

References Cited in the file of this patent

UNITED STATES PATENTS

| 2,305,539 | Lowry | Dec. 15, 1942 |
| 2,719,797 | Rosenblatt | Oct. 4, 1955 |

FOREIGN PATENTS

| 20,770 | Great Britain | of 1905 |
| 604,415 | Canada | Aug. 30, 1960 |
| 845,043 | Great Britain | Aug. 17, 1960 |
| 1,220,408 | France | Jan. 4, 1960 |